(12) United States Patent
Kirchner

(10) Patent No.: US 8,276,427 B2
(45) Date of Patent: Oct. 2, 2012

(54) METAL-FORMING MACHINE IN PARTICULAR A FORGING PRESS

(75) Inventor: Walter Kirchner, Juechen (DE)

(73) Assignee: SMS Meer GmbH, Moenchengladbach (DE)

( * ) Notice: Subject to any disclaimer, the term of this patent is extended or adjusted under 35 U.S.C. 154(b) by 228 days.

(21) Appl. No.: 12/720,994

(22) Filed: Mar. 10, 2010

(65) Prior Publication Data

US 2010/0269563 A1  Oct. 28, 2010

(30) Foreign Application Priority Data

Apr. 23, 2009 (DE) .......................... 10 2009 018 352
Jan. 20, 2010 (DE) .......................... 10 2010 005 165

(51) Int. Cl.
*B21D 22/00* (2006.01)
*B21D 37/12* (2006.01)
*B30B 1/42* (2006.01)

(52) U.S. Cl. .............................. 72/352; 72/455; 100/214

(58) Field of Classification Search ................... 72/343, 72/352, 454, 455, 456, 253.1, 273.5, 353.6, 72/358, 359; 100/214, 230, 240, 257, 269.17
See application file for complete search history.

(56) References Cited

U.S. PATENT DOCUMENTS

| | | | | |
|---|---|---|---|---|
| 1,756,416 A * | 4/1930 | Woodhead | ....................... | 72/333 |
| 2,809,546 A * | 10/1957 | Broske | ............................. | 29/517 |
| 3,263,728 A * | 8/1966 | Lynch | ............................. | 411/349 |
| 3,520,170 A * | 7/1970 | Wilson, Jr. | ....................... | 72/325 |
| 3,848,472 A | 11/1974 | Pim | ................................... | 74/52 |
| 4,736,675 A * | 4/1988 | Stoll | ................................. | 92/13 |
| 4,907,959 A * | 3/1990 | Hauch | ........................... | 425/406 |
| 5,619,884 A | 4/1997 | Endter | ........................... | 74/449 |
| 6,085,570 A * | 7/2000 | Preaus | ........................ | 72/389.7 |
| 6,234,000 B1 * | 5/2001 | Bowling | .................... | 72/370.23 |
| 2003/0126902 A1 * | 7/2003 | Marando et al. | .................. | 72/61 |
| 2004/0231397 A1 * | 11/2004 | Faitel et al. | ..................... | 72/454 |
| 2009/0053009 A1 * | 2/2009 | Steinbock et al. | ............ | 411/432 |

OTHER PUBLICATIONS

Machinery's Handbook, 26th Edition, Industrial Press Inc., New York, ISBN 0-8311-2666-3, p. 1492; Jan. 2000.*

* cited by examiner

*Primary Examiner* — Edward Tolan
*Assistant Examiner* — Lawrence J Averick
(74) *Attorney, Agent, or Firm* — Andrew Wilford

(57) ABSTRACT

A frame of a metal-forming press having upper and lower traverses interconnected by vertical columns having upper and lower ends is provided with respective sets each of a plurality of identical tension bolts at each end of each of the columns. The traverses are formed at each end of each column with an array of throughgoing holes through each of which a respective one of the bolts extends, and the columns have opposite ends each formed with an identical array of blind threaded bores each in turn aligned with a respective one of the throughgoing holes. Each bolt has an inner end seated in a respective on of the bores of the respective column end and an outer end bearing inwardly on a face of the respective traverse.

13 Claims, 2 Drawing Sheets

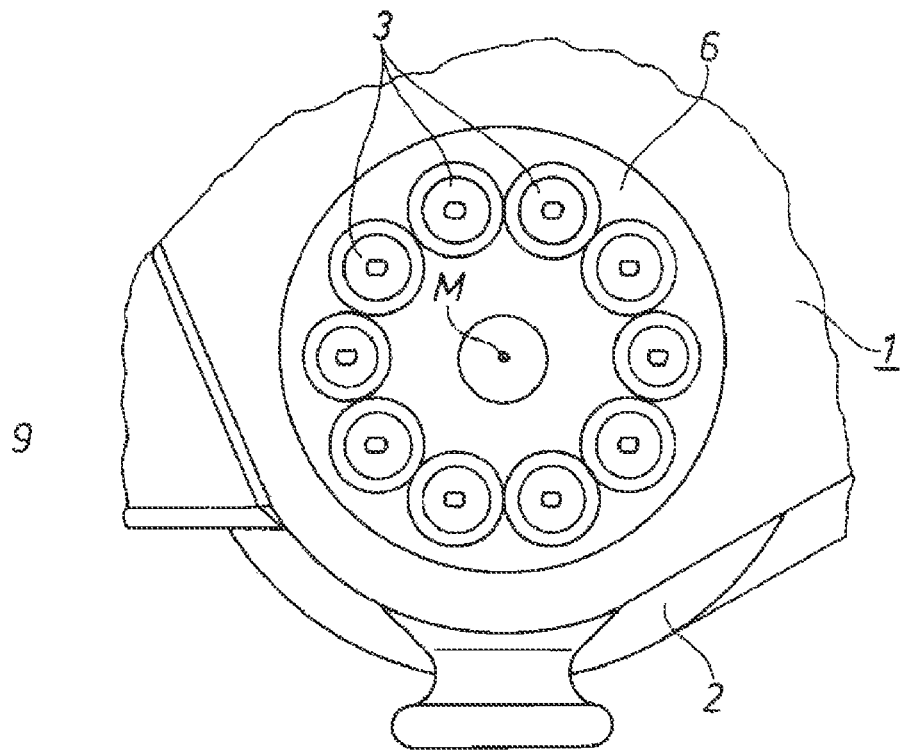
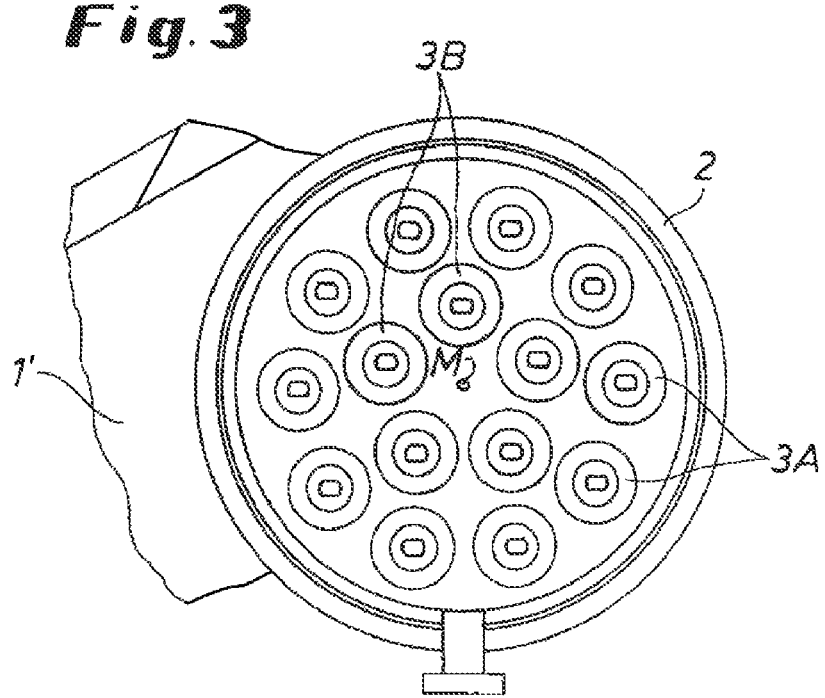

METAL-FORMING MACHINE IN PARTICULAR A FORGING PRESS

FIELD OF THE INVENTION

The present invention relates to a metal forming machine. More particularly this invention concerns a forging press.

BACKGROUND OF THE INVENTION

A forging press, for example an eccentric forging press or a screw press, usually has a machine frame that for a large press is made of solid or tubular columns that extend between and seated in fixed upper and lower transverse beams and that are clamped in place by tie rods. Such a press frame is described for example in U.S. Pat. No. 5,619,884. Tension bolts extend throughgoing bores in the upper and lower press traverse as well as through bores that extend through the full length of the columns and through the machine frame. This requires long bores that are complex to form in the press columns and long tie rods or press anchors with a large shank and thread diameter. Moreover, extensive mounting aids and increased crane elevation heights are necessary due to the special length of the tension bolts and to mount the long anchors. Furthermore, transporting the bolts also requires special precautions, since they must generally have a length that is greater than the overall height of the entire machine frame.

OBJECTS OF THE INVENTION

It is therefore an object of the present invention to provide an improved metal-forming machine.

Another object is the provision of an improved frame for such a metal-forming machine that overcomes the above-given disadvantages, in particular that increases the press rigidity and reduces the press size.

SUMMARY OF THE INVENTION

A frame of a metal-forming press having upper and lower traverses interconnected by vertical columns having upper and lower ends is provided with respective sets each having a plurality of identical tension bolts at each end of each of the columns. The traverses are formed at each end of each column with an array of throughgoing holes through each of which a respective one of the bolts extends, and the columns have opposite ends each formed with an identical array of blind threaded bores each in turn aligned with a respective one of the throughgoing holes. Each bolt has an inner end seated in a respective on of the bores of the respective column end and an outer end bearing inwardly on a face of the respective traverse.

With sets of tension bolts of this type it is possible to type it is possible to prestress the connection of the individual components of a closed press frame such that a press force acting on the frame during the forging process does not cause spreading of the frame or strain fissures on the connecting surfaces of the individual components. Thus a defined press force can be applied to the workpiece during the forging process or general press operation.

In the case of a forge or press, a forming die or a die block or in general a lower die half is generally fixed to the lower traverse, and an upper die that can be moved up and down as well as the control drive with the force application device are mounted on the upper traverse. For example, during the forging operation, a workpiece is inserted between the upper traverse and the lower traverse and formed between the two dies by lowering the upper die toward the lower die. Forming forces are thus produced that are transmitted to the machine frame via the dies.

For the purposes of the invention, the provision of screws running through the entire height of the machine frame is dispensed with by using at least two respective tension bolts at each connecting surface between the upper traverse and one or more columns on the one hand and the lower traverse and one or more columns on the other hand. These tension bolts extend through throughgoing holes in the traverses, but not through throughgoing holes in the columns. Instead, for the purposes of the invention, blind threaded holes are provided in the columns into which the tension bolts extend and allow the transmission of tension between the traverses and column via a threaded engagement.

In this manner, not only is it possible to achieve significant savings by avoiding long throughgoing bores in the press column, cost savings also result from the possibility of optionally using commercially available press anchors with much smaller length and mass. Finally, the ease of assembly of the press overall is also improved. In this manner ultimately the production costs as well as the transport costs are considerably reduced. Furthermore, press rigidity can be increased virtually as desired by the use of a desired number of tension bolts per connecting area, and the replacement in the event of failure is facilitated. Also the failure of a single tension bolt does not necessarily have to lead to the breakdown of the entire forming-machine, instead the replacement of individual tension bolts can optionally also be carried out during continuous operation, for example, with the temporary application of lower loads. Finally, formation of the columns according to the invention only with a number of blind holes in the connecting areas also renders possible production essentially by casting technology. only one final threading of blind holes already provided by casting and the insertion of the threaded part necessary for bracing with the tension bolt has to be carried out.

Finally, the use of a plurality of comparatively short tension bolts to brace the machine frame also makes possible a clear reduction in overall press size, since the press size does not depend largely on the strength of a single comparatively long and accordingly thin tension bolt.

In an advantageous embodiment of the invention, the metal-forming machine is a forging press, preferably an eccentric forging press or screw press, preferably with an operating force of at least 80 NM, in particular at least 100 MN. In the case of such medium-sized or large forging presses, the effect that can be achieved through the invention compared to the conventional designs is particularly great. In the case of eccentric forging presses, the influence of dynamic forces on the machine frame is particularly high, so that particularly high demands are made on the rigidity of the machine frame and ultimately the strength of the connecting surfaces.

The number of tension bolts used for the purposes of the invention for each connecting surface is not limited, as long as at least two tension bolts per connection, that is per column end, are provided. However, it is considered to be advantageous if the same number of tension bolts is assigned to each connecting surface, since symmetry of rigidity of the machine frame overall can be achieved hereby. As a result, a machine frame is obtained that, if measurable deflections of the machine frame occur at all, has uniform bending at all of the connection points of the machine frame.

In another preferred embodiment of the invention, the blind holes extend into the columns, preferably into the end faces of the columns, over a length of no more than 20% preferably no more than 10% of the respective column lengths. The manufacture of the columns is optionally also already advantageously improved hereby essentially during forming by casting with sufficient tensile stiffness of the machine frame as a whole.

It is preferred that the connection between the upper traverse and the columns is made via at least five, preferably at least ten tension bolts. Furthermore, it is particularly preferred if the connection between the lower traverse and the columns is made via an equal or at least comparable number of tension bolts. A particularly secure and rigid connection between the individual components of the machine frame is thus achieved with simple means. In general it can also be assumed that as more tension bolts used, the smaller the length of the individual blind holes and/or the diameter of the individual tension bolts can be without causing negative effects to the safety of the entire metal-forming machine.

For the purposes of the invention, the arrangement of the blind holes and thus the point of application for the prestressing force and holding force applied by the tension bolt to the connection surfaces of the individual components is not restricted. However, it is preferred that the blind holes be arranged at least in pairs, preferably in groups and in particular symmetrically in the end faces of the columns. The number and arrangement of the pairs and groups over the end face of the columns is not restricted. However, it is preferred if, in the case of an essentially cylindrical column with a round cross section, the blind holes are arranged at least in part in circular arrays concentrically around the center point of the circular end face, normally centered on a center axis of the column. Furthermore, an embodiment is particularly preferred in which the blind holes are arranged on at least two concentric circles. A particularly secure connection of the columns to the upper and lower cross rails is thus achieved so that the prestressing force acting on the columns preferably acts essentially uniformly on the column over the entire end face and local excessive stress loads are avoided.

The number of blind holes in each circular array is not restricted either. However, an embodiment is preferred in which the blind holes of at least one group, but preferably all of the blind holes, are arranged essentially angularly equidistantly to one another. This means that fewer blind holes are arranged on the inner pitch circle than on the outer pitch circle. An embodiment of this type of fewer blind holes on an inner pitch circle compared with the number of blind holes on an outer pitch circle is furthermore preferred even with a nonequidistant arrangement of the blind holes to one another.

For an arrangement of this type, the press columns/press boxes are provided on their end faces with threaded blind hole arranged on one or more pitch circles. The upper and lower press traverses to be bolted in place have the same number of throughgoing holes. Tension bolts are inserted into the threaded blind holes and are prestressed via mechanical, hydraulic or thermal tensioners. The entire prestressing thereby preferably lies above the operating force of the press (e.g. 80-100 MN) and prevents the confronting contact surfaces of the traverse and of the column from separating. With tension bolts of a suitable length, which, if necessary, can be further extended by an extension sleeve and optionally a rigid intermediate element, the deflection tensions can be kept to a low level.

In a further preferred embodiment of the metal-forming machine according to the invention, the blind holes in the column ends all have the same diameter and the same depth in order to thus enhance symmetry in a particularly advantageous manner. If necessary, however, it is possible to deviate from this principle when asymmetrical forces act in the metal-forming machine or a different rigidity of the metal-forming machine on one side is desired overall.

The metal-forming machine according to the invention can use tension bolts of any kind. However it is preferred if the tension bolts have a shank section and a threaded end that engages in a thread provided in the corresponding blind hole. It is particularly preferred if the unthreaded shank section of such a length that it extends through the entire throughgoing bore in the upper and/or lower traverse, which may carry a spacer or load-spreading washer on one or both faces.

BRIEF DESCRIPTION OF THE DRAWING

The above and other objects, features, and advantages will become more readily apparent from the following description, reference being made to the accompanying drawing in which:

FIG. 2 is a top view of the structure shown in FIG. 1; and

FIG. 3 is a bottom view of a variation on the frame of FIG. 1.

SPECIFIC DESCRIPTION

Figure 1:
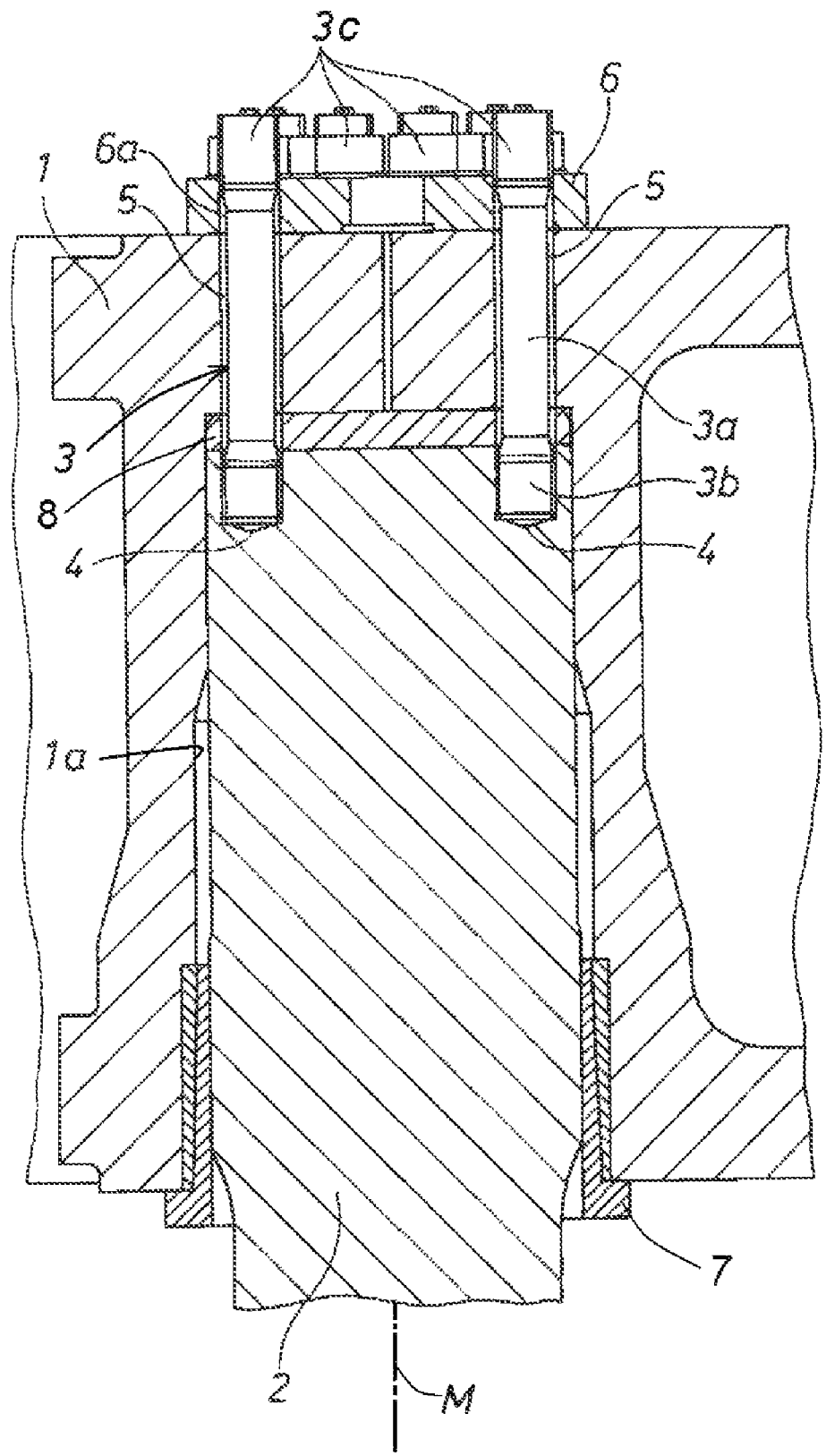
FIG. 1 is a vertical section through a portion of a frame of a forming press according to the invention.

As seen in FIGS. 1 and 2 a metal-forming machine or press according to the invention has an upper traverse 1 that is a horizontally extending steel beam formed at each end with a downwardly open cylindrical blind bore 1a in which is seated the cylindrical upper end of a solid steel press column 2. The lower end of the column 2 is fitted substantially identically in an end of an unillustrated lower traverse beam, but for simplicity's sake the discussion here will relate to the structure of the illustrated one end of the upper traverse. The column 2 is centered on a respective vertical axis M.

According to the invention the upper end of the column 2 is secured to the upper traverse 1 by ten tension bolts 3, of which six are shown in FIG. 1, two in section. More particularly, the upper web of the traverse 1 is formed with a circular array centered on the axis M of ten throughgoing holes 5. Sitting on an upper face of the traverse beam 1 over these holes 5 is a thick and circular steel washer formed with an identical array of holes 6a. The upper end of the column is formed centered on the axis M with a circular array of upwardly open and internally threaded blind bores 4 that each are vertically axially aligned with a respective one of the throughgoing bores 5 and 6a. A washer 8 with bores identical to the bores 5 and an outside diameter identical to that of the column 2 is sandwiched between the upper end of the column 2 and the lower face of the upper web of the traverse 1.

Each bolt 3 has an unthreaded cylindrical shank 3a of smaller diameter than the respective holes 6 and 5a and an externally threaded lower end 3a seated in a respective one of the internally threaded blind bore 4 opening at the planar upper face of the column 2. The lower threaded ends 3a are of greater diameter than the central shanks 3a. In addition each bolt 3 has a headed or threaded upper end 3c that bears downward on the planar upper face of the washer 6.

Thus with this system the normally prestressed connection between the column 2 and traverse 1 is via the ten bolts 3 whose heads 3c can be screwed down onto the washer 6. The annular array of bolts 3 spreads out the force and allows a very solid connection to be made.

In FIG. 2 a different system is shown where a lower end of the column 2 is secured to a lower traverse 1' by an outer array of ten bolts 3A substantially identical to the bolts 3 of FIGS.

1 and 2 and a circular inner array of five more such bolts 3*b* that is coaxial with the outer array and formed of identical bolts passing through and seated in identical holes. Thus fifteen bolts spread over the entire upper end of the column 2 can lock it in place, allowing once again a very strong connection to be made without significantly increasing the height of the press or requiring massive tools to tighten. Each of the inner bolts 3B is angularly positioned between two of the outer bolts 3A so that the bolts 3A and 3B are oriented in arrays each shaped as an equilateral triangle for extremely uniform force distribution.

I claim:

1. In forging press, a frame comprising:
   upper and lower traverses having respective downwardly and upwardly open blind seat bores and formed at each of the seat bores with an array of vertically throughgoing holes opening into the respective seat bores;
   vertical columns having upper and lower ends seated in the seat bores of the upper and lower traverses and each formed with upwardly and downwardly open internally threaded blind bores; and
   respective sets at each end of each of the columns of a plurality of identical tension bolts each extending through a respective one of the holes and having an inner end seated in a respective one of the threaded blind bores of the respective column end and an outer end bearing inwardly on a face of the respective traverse.

2. The frame defined in claim 1 wherein the press operates with a force of at least 80 NM.

3. The frame defined in claim 1 wherein the threaded blind holes each have a length of no more than 20% of that of the respective column.

4. The frame defined in claim 3 wherein the length of the threaded blind bores is no more than 10% of the column length.

5. The frame defined in claim 1 wherein there are at least five such bolts, holes, and threaded blind bores at each end of each column.

6. The frame defined in claim 1 wherein there are at least ten such bolts, holes, and threaded blind bores at each end of each column.

7. The frame defined in claim 1 wherein the columns are centered on respective axes and the holes and threaded blind bores are oriented in arrays centered on and around the respective axes.

8. The frame defined in claim 7 wherein the arrays are circular and the holes and threaded blind bores are angularly equispaced.

9. The frame defined in claim 8 wherein there are two such concentric circular arrays of holes and threaded blind bores at each column end.

10. The frame defined in claim 1 wherein each column end is cylindrical and the respective blind seat bore is complementary seat thereto.

11. The frame defined in claim 1 wherein the threaded blind bores are of substantially the same diameter and depth.

12. The frame defined in claim 1 wherein the holes are cylindrical and are of substantially the same diameter.

13. The frame defined in claim 1 wherein each bolt has an unthreaded cylindrical shank of smaller diameter than the respective hole and an externally threaded lower end seated in the respective threaded blind bore and of greater diameter than the respective shank.

* * * * *